Patented Jan. 9, 1923.

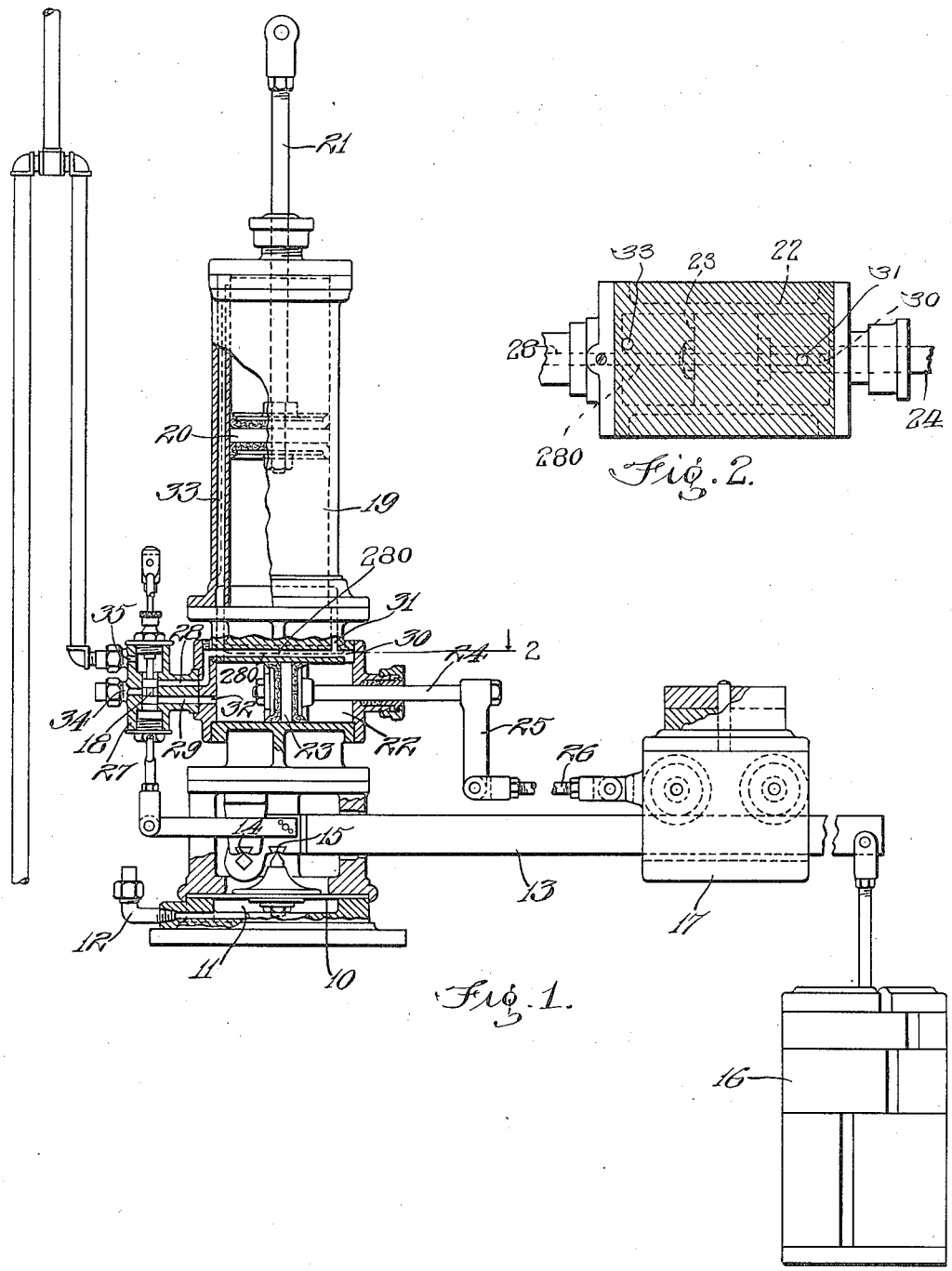

1,441,594

UNITED STATES PATENT OFFICE.

GEORGE S. MELCHER, OF SHARON, MASSACHUSETTS, ASSIGNOR TO CHARLES W. McCONNEL, OF BOSTON, MASSACHUSETTS, ELDON MACLEOD, OF WESTWOOD, MASSACHUSETTS, AND FANNIE B. LOOK, OF NORTHAMPTON, MASSACHUSETTS, TRUSTEES, DOING BUSINESS AS MASON REGULATOR COMPANY.

PRESSURE REGULATOR.

Application filed October 31, 1921. Serial No. 511,710.

*To all whom it may concern:*

Be it known that I, GEORGE S. MELCHER, a citizen of the United States, residing at Sharon, county of Norfolk, State of Massachusetts, have invented a certain new and useful Improvement in Pressure Regulators, of which the following is a specification, reference being had therein to the accompanying drawings.

This invention relates to pressure regulators for power plants and the like, and especially, though not exclusively, to pressure regulators of the type shown in Letters Patent No. 1,291,063, granted to me January 14, 1919, and in my prior application for Letters Patent filed July 14, 1920, Serial No. 396,183.

A regulator of this type comprises essentially a diaphragm or equivalent member responsive to the boiler pressure or other pressure to be controlled, means, usually in the form of a lever weighing apparatus, for opposing the movement of said pressure responsive member and acting to move said member in one direction when the pressure falls, or to be moved by said member in the opposite direction when the pressure rises, together with means operated and controlled by said weighing or equivalent apparatus for regulating the pressure. Said last named means, in regulators of a well-known type, comprises a pilot valve actuated by the lever weighing apparatus and a fluid pressure motor controlled by the pilot valve and serving to open and close the dampers of the boiler, or to control the throttle of the blowing engine, or otherwise to regulate the conditions of heat which, in turn, govern the pressure. In the constructions shown in my prior patent and prior application above referred to, means, in the form of a travelling weight movable lengthwise on the weighing lever, are provided whereby the effective counterbalancing moment, or force with which the weighing apparatus opposes the movement of the diaphragm or other pressure responsive member, may be varied.

In the use of apparatus of this character, it is desirable that the reponse of the regulator, and of the parts controlled thereby, to variations in pressure, while prompt in its inception and sufficient in the aggregate to meet all the requirements of the apparatus, take place gradually. Otherwise, upon a sudden change in pressure, the reaction of the regulating mechanism is likely to be too violent, resulting in an overactuation of the parts and consequently an uneven regulation. The present invention has for its primary object to provide an apparatus of the character referred to whereby the member which regulates the pressure is, in response to change, in pressure, given a step-by-step movement made up of a series of very short steps with intervening intervals of rest, so that there is no sudden change in the draft on the furnace or in the setting of the other regulating instrumentalities, said member being, however, instantly responsive to changes of load on the system and having a total range of movement fully sufficient to give the required range of control.

The foregoing and other objects of the invention, together with means whereby the same may be carried into effect, will best be understood from the following description of one form or embodiment thereof illustrated in the accompanying drawings. It will be understood that this is not the only possible embodiment of my invention, but that it is the form which I prefer.

In said drawings:

Fig. 1 is a somewhat diagrammatic side elevation, partly in section, of substantially the complete apparatus, or so much thereof as is necessary to illustrate the invention.

Fig. 2 is a detail horizontal section taken substantially on line 2, Fig. 1.

In the construction shown, 10 denotes a diaphragm subjected on its under side to the boiler pressure or other pressure to be regulated, which pressure is admitted to a closed chamber 11 beneath said diaphragm through a pipe 12. Movement of the diaphragm 10 under the influence of the pressure is opposed, and said pressure counterbalanced, by a weighing apparatus which includes a lever 13 fulcrumed at 14 and bearing at 15 upon the diaphragm 10. At one side of the fulcrum 14, beyond the bearing 15, the lever 13 carries a main counterweight 16 and a carriage or travelling weight 17 movable longitudinally on said lever in order to vary the effective counterbalancing moment thereof. This is a convenient but not the only mechanism for applying to the diaphragm the necessary variable counterbalancing force. At the opposite side of the fulcrum 14, the lever 13 is connected with a pilot valve 18 which controls the admission of fluid pressure (preferably hydraulic pressure) to, and its exhaust from, a fluid pressure motor, herein shown as comprising a cylinder 19 containing a double acting piston 20 having a piston rod 21 which is connected with the damper, throttle, or other means by which the pressure supplied through the pipe 12 is regulated or controlled. Except as hereinafter more fully described, the parts thus far referred to, as to their general construction, arrangement and function, may be of any of the forms illustrated in my prior patent and prior application, or otherwise as may be preferred.

In accordance with the present invention, the pilot valve 18, in addition to controlling the movements of the piston 20 of the cylinder 19, serves also to control a supplementary fluid pressure motor comprising a cylinder 22 supporting the cylinder 19 and containing a double acting piston 23 having a piston rod 24 which is operatively connected, as by an arm 25 and a rod 26, with the carriage or movable weight 17. In the construction shown, the casing 27 of the pilot valve 18 is provided with pressure inlet and exhaust connections 34 and 35, respectively, and is formed with upper and lower ports or passages 28 and 29 communication of which with said inlet and exhaust connections is controlled by said pilot valve. The port 28 communicates, through a passage 280, with passages 30 and 31, leading respectively to the outer end of the cylinder 22, or that nearest the carriage 17, and to the inner or lower end of the cylinder 19. The port 29 communicates, through a port 32, with the opposite or inner end of the cylinder 22; which, in turn, is in communication with the outer or upper end of the cylinder 19 through a passage 33 which extends through the wall of the cylinder 19 and through the top of the cylinder 22 at one side of the passage 280.

The operation of the device is as follows: A drop in the pressure supplied through the pipe 12 to the chamber 11 permits the diaphragm 10 to be depressed by the lever 13 under the influence of the weights 16 and 17. The downward movement of the weighted end of the lever 13 causes its opposite end to rise, thereby lifting the pilot valve 18 and permitting presure fluid supplied through the connection 34 to be admitted through the port 28 and pasage 30 to the outer end of the cylinder 22 of the supplementary motor and also through the passage 31 to the lower end of the cylinder 19 of the primary motor. The piston 20 of the primary motor thereupon moves upwardly, thereby operating the damper, throttle, or other regulating instrumentality in the manner required to cause an increase in the pressure supplied through pipe 12. At the same time, the piston 23 is moved inwardly, thereby moving the weight 17 toward the fulcrum 14 and decreasing the effective counterbalancing moment thereof. This allows the weighted end of the lever 13 to rise, pulling down the pilot valve 18 and placing the latter in the lap position in which both ports 28 and 29 are closed. The movement of the pilot valve into lap positon results in simultaneously checking the movements of both the pistons 20 and 23, thereby checking the movement of the damper, throttle, or other regulating device immediately after such movement has begun. Should the pressure continue to fall, indicating that the regulating device has not yet been operated to a sufficient extent, the weighted end of the lever 13 will soon be again depresed, and the operation will be repeated, resulting in a further partial opening of the damper or throttle. In this way, the piston 20 will be given a step-by-step movement throughout the entire range of the cylinder 19, or so much thereof as may be required. This movement will be in relatively short steps, so that there will be no sudden change in the draft from the furnace, although a drop in pressure will be immediately followed by a slight change which is increased gradually up to the point necessary to produce the desired result. The piston 23 will normally only have a very slight range of movement, and will remain in about the same general position in the cylinder 22. The total variation in the counterbalancing effect of the weighing apparatus will therefore be relatively small, so that variations in the pressure as determined by the apparatus will be correspondingly small and said pressure kept substantially constant, notwithstanding the operation of the checking means. It will be seen that upon an abnormal increase in pressure, the step-by-step movement above referred to will be reversed, the pilot valve 18 being alternately placed in lap position and depressed to admit pressure to the inner end of the cylinder 28 and upper end of the cylinder 19 while exhausting the opposite ends of said cylinders.

It will thus be seen that the invention comprises two pressure motors, one of which operates the furnace damper, the blowing engine throttle valve, or other regulating device, and the other of which determines the effective counterbalancing moment of the apparatus to the presure to be controlled, said motors being independent of each other but movable simultaneously and with a predetermined relation to each other in such a manner that, upon an incipient movement of one, the effective operation of the other will be to check such movement, thereby causing the total movement of the first to be an intermittent one, and providing a sensitiveness and wide range of control, while preventing all suddenness or violence of operation.

What I claim is—

1. In a pressure regulator, in combination, a member responsive to the pressure to be regulated, counterbalancing means co-operating with said member, means controlled by said counterbalancing means for regulating said pressure, and means other than said regulating means but movable simultaneously therewith and in predetermined relation thereto for automatically varying the effective counterbalancing moment of said counterbalancing means.

2. In a pressure regulator, in combination, a member responsive to the pressure to be regulated, counterbalancing means co-operating with said member, means controlled by said counterbalancing means for regulating said pressure, and means other than said regulating means but movable simultaneously therewith and in predetermined relation thereto for successively decreasing the effective counterbalancing moment of said counterbalancing means upon each movement of said regulating means in a direction to cause an increase of said pressure.

3. In a pressure regulator, in combination, a member responsive to the pressure to be regulated, counterbalancing means co-operating with said member, means for regulating said pressure, means other than said regulating means for varying the effective counterbalancing moment of said counterbalancing means, and a common controller for said last two means operated by said counterbalancing means.

4. In a pressure regulator, in combination, a member responsive to the pressure to be regulated, counterbalancing means cooperating with said member, a fluid pressure motor controlled by said counterbalancing means for regulating said pressure, and a second fluid pressure motor operable simultaneously with said first named motor and in predetermined relation thereto for varying the effective counterbalancing moment of said counterbalancing means.

5. In a pressure regulator, in combination, a member responsive to the pressure to be regulated, counterbalancing means cooperating with said member, a fluid pressure motor for regulating said pressure, a second fluid pressure motor for varying the effective counterbalancing moment of said counterbalancing means, and a valve operated by said counterbalancing means for controlling both of said motors.

6. In a pressure regulator, in combination, a member responsive to the pressure to be regulated, counterbalancing means cooperating with said member, a fluid pressure motor for regulating said pressure, a second fluid pressure motor for varying the effective counterbalancing moment of said counterbalancing means, and a valve operated by said counterbalancing means for controlling both of said motors, said valve having a lap position wherein movement of either of said motors in either direction is prevented.

7. In a pressure regulator, in combination, a member responsive to the pressure to be regulated, counterbalancing means cooperating with said member, means controlled by movement of said counterbalancing means in response to movement of of said member for regulating said pressure, and separate means cooperating with said counterbalancing means for arresting each movement of said regulating means until further movement of said member.

8. In a pressure regulator, in combination, a diaphragm which is subjected to the pressure to be regulated, a lever which acts on the other side of said diaphragm to oppose said pressure, a cylinder having a double acting pressure regulating piston therein, a travelling weight movable on said lever, a second cylinder having a double acting piston therein and a piston rod operatively connected with said weight, and a valve operated by said lever for controlling the distribution of fluid pressure to said cylinders.

In testimony whereof I affix my signature.

GEORGE S. MELCHER.